V. G. HUML.
ANTISKID ATTACHMENT.
APPLICATION FILED MAR. 18, 1918.
1,288,005.
Patented Dec. 17, 1918.
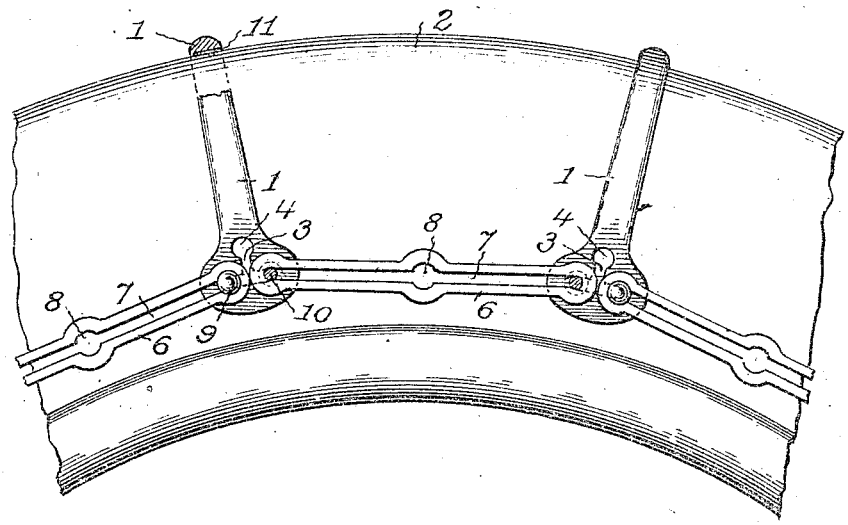
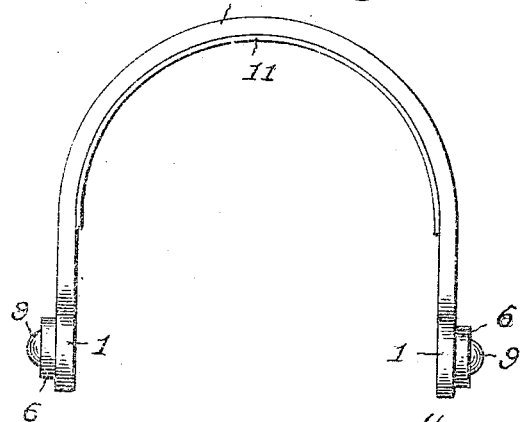
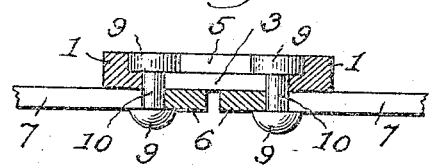
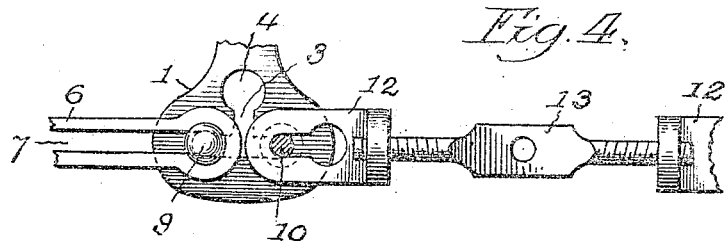
Witness:
John Enders
Inventor:
Vincent G. Huml,
by Robert Burns,
Atty.

UNITED STATES PATENT OFFICE.

VINCENT G. HUML, OF CHICAGO, ILLINOIS.

ANTISKID ATTACHMENT.

1,288,005.          Specification of Letters Patent.          Patented Dec. 17, 1918.

Application filed March 13, 1918. Serial No. 223,022.

*To all whom it may concern:*

Be it known that I, VINCENT G. HUML, a citizen of the United States of America, and a resident of Chicago, in the county of Cook, State of Illinois, have invented certain new and useful Improvements in Antiskid Attachments, of which the following is a specification.

This invention relates to that class of antiskid attachments for the pneumatic or resilient tires of vehicle wheels, in which a series of yoke shape tread members are pivotally connected together at their respective inner ends or terminals by coupling links, and the present improvement has for its object:—

To provide a simple and efficient structural formation and combination of parts adapted to afford a light durable and effective structure in which the various parts of the attachment are pivotally connected together in a readily detachable manner for convenient replacement and repair, all as will hereinafter more fully appear.

In the accompanying drawing:—

Figure 1, is a detail side elevation with parts broken away and in section, illustrating the present invention as applied to an ordinary pneumatic tire.

Fig. 2, is an end elevation of the attachment, shown in Fig. 1.

Fig. 3, is a detail horizontal section through the ends of the tread members and coupling links of the appliance.

Fig. 4, is a detail elevation of the means for tightening the attachment after application to a wheel tire.

Like reference numerals indicate like parts in the several views.

Referring to the drawing, 1 designates a plurality of tread members having the usual radial and spaced relation around the tire 2 of a wheel and having the usual yoke shape so as to straddle and fit said wheel tire. In the present improvement each inwardly disposed end of the tread member 1 is formed with an enlarged head, which in turn is formed with an inverted T shape slit 3 in manner indicated in Figs. 1 and 4. The apex of the slit 3 is formed with an enlarged orifice 4 for the insertion of the hereinafter described pivot studs, and back of said slit 3 the tread member 1 is formed with a sunken recess 5 adapted to receive the inner heads of the pivot studs above referred to, and as illustrated in Fig. 3.

6 designates coupling links formed with enlarged terminal ends or eyes, and with longitudinal slits 7, preferably extending the greater part of the links 6, and having intermediate their lengths enlarged entrance orifices 8 for the insertion of the heads of the pivot studs above referred to.

9 designates one of the pivot studs above referred to, and which in the present structure comprises a pair of heads integrally connected together in proper spaced relation by a connecting shank 10 as shown more particularly in Fig. 3.

11 designates a lining of rubber or the like, attached to the inner and bearing surface of the tread member 1, with a view to lessen the wear, etc., between the contacting surfaces.

12 designate angle pieces adapted for engagement in manner substantially as above described with the pivot studs 9 at the respective ends or terminals of the present attachment.

13 designates a turn bolt formed with right and left handed screw-threads on its respective ends and which have operative engagement with screw-threaded orifices in the angle pieces 12 aforesaid, to effect the usual operation of tightening the attachment around the wheel tire after the attachment has been applied thereto, and in loosening the attachment when it is desired to remove the same.

In an assemblage of the parts of the present structure, a pair of pivot studs 9 are passed through the entrance orifice 4 of the tread member 1, and moved in an inward and lateral direction in the T shape slit 3 to the position illustrated in Fig. 1, with the inner heads of the pivot studs 9 resting in the recess 5 of said tread member 1.

The entrance orifice 8 of a coupling link 6 is then passed over the outer head of its individual pivot stud aforesaid, after which the coupling link 6, with its longitudinal slit 7 in engagement with the shank of said stud, is moved lengthwise to bring said shank to bearing engagement at one end of the elongated slit 7. This operation is repeated in effecting a series of couplings 6 with the tread members 1 of the complete attachment.

Having thus fully described my said invention, what I claim as new and desire to secure by Letters Patent, is:—

1. In an anti-skid attachment, the combination of a plurality of yoke shape tread members formed with T shape slits in their terminal ends, a plurality of coupling links formed with longitudinal slits, and a plurality of double headed studs adapted for engagement in the aforesaid slits of the tread members and coupling links, substantially as set forth.

2. In an anti-skid attachment, the combination of a plurality of yoke shape tread members formed with T shape slits and enlarged entrance orifices in their terminal ends, a plurality of coupling links formed with longitudinal slits, and a plurality of double headed studs and adapted for engagement in the aforesaid slits of the tread members and coupling links, substantially as set forth.

3. In an anti-skid attachment, the combination of a plurality of yoke shape tread members formed with T shape slits in their terminal ends, a plurality of coupling links formed with longitudinal slits and enlarged entrance orifices, and plurality of double headed studs adapted for engagement in the aforesaid slits of the tread members and coupling links, substantially as set forth.

Signed at Chicago, Illinois, this 13th day of March, 1918.

VINCENT G. HUML.